Patented Oct. 22, 1940

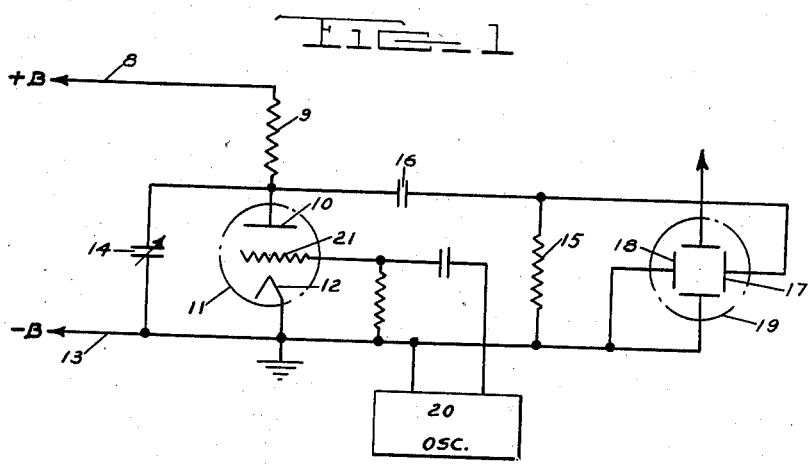
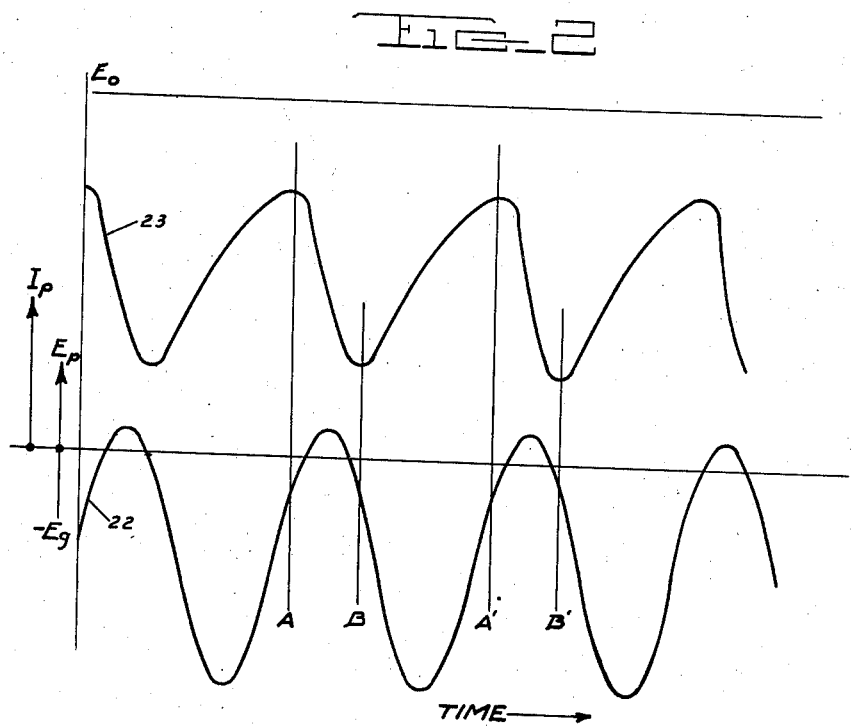

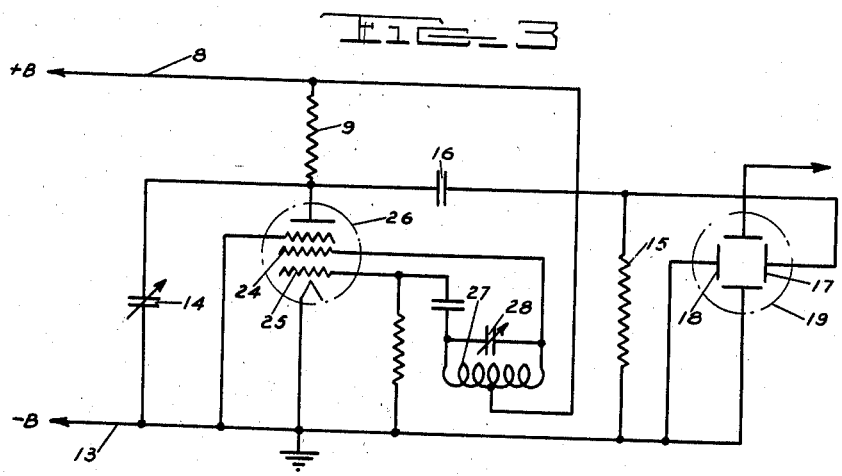
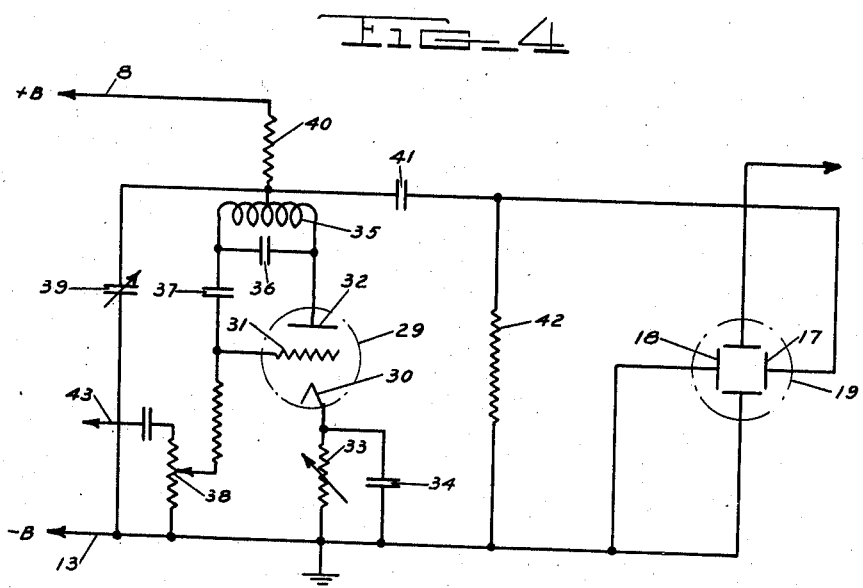

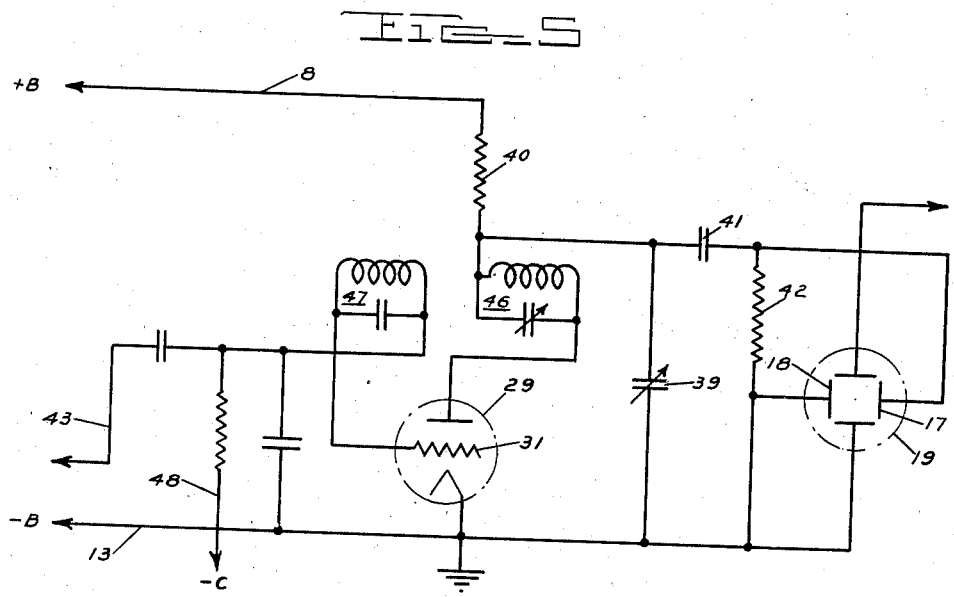
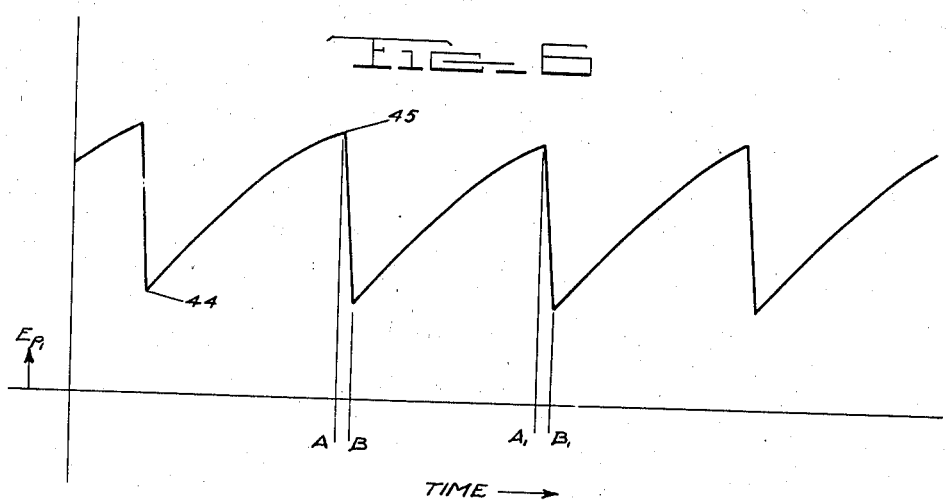

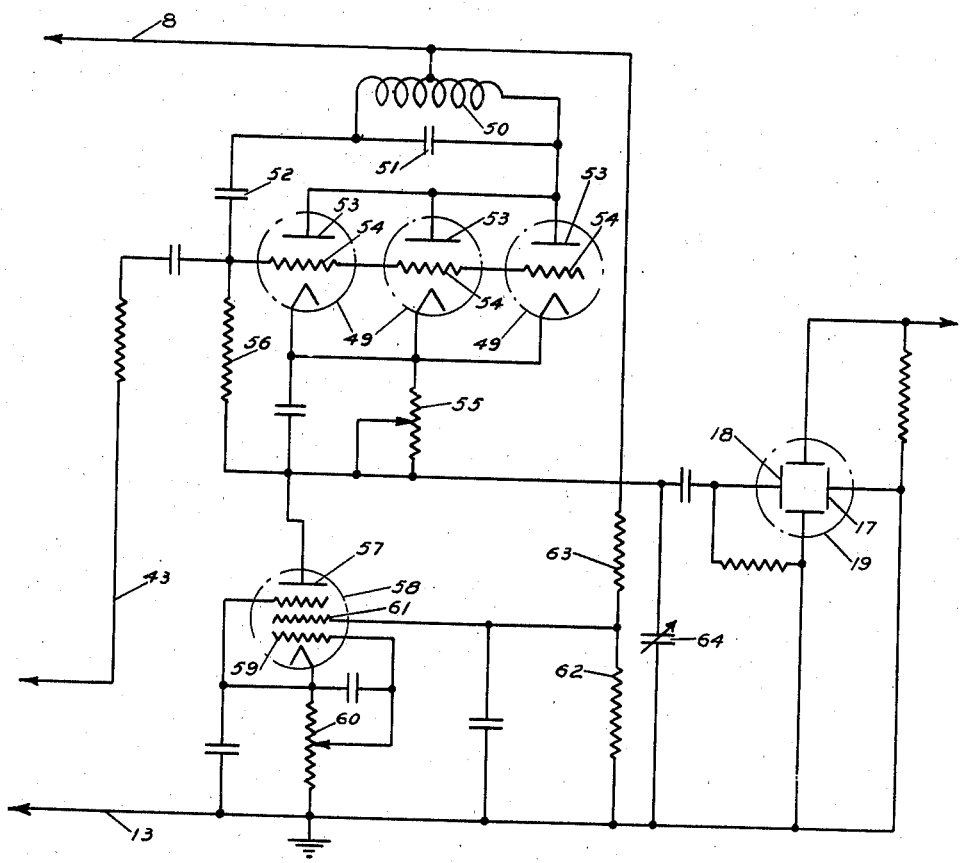

2,218,549

UNITED STATES PATENT OFFICE 2,218,549

CATHODE RAY SWEEP CIRCUIT

La Verne R. Philpott, Washington, D. C.

Application November 10, 1938, Serial No. 239,820

9 Claims. (Cl. 250—36)

(Granted under the act of March 3, 1883, as amended April 30, 1928; 370 O. G. 757)

This invention relates to apparatus for generating a linear or an exponential time axis sweep voltage for a cathode ray oscillograph. The invention also contemplates apparatus for periodically applying and removing a voltage for other purposes.

Among the several objects of this invention are:

To provide means for generating a sweep voltage of high amplitude;

To provide a sweep voltage of variable frequency, from about five cycles per second to one million or more cycles per second;

To provide a sweep voltage of constant amplitude at all frequencies;

To provide apparatus that permits easy synchronizing of the sweep voltage to some harmonic control voltage.

Other objects will be apparent to those skilled in this art from the following description when read in connection with the accompanying drawings wherein:

Fig. 1 is a schematic diagram of one form of the present invention utilizing a high vacuum electron discharge tube controlled by an oscillator;

Fig. 2 shows graphically the nature of the sweep voltage in its relation to the grid voltage of the tube in Fig. 1;

Fig. 3 depicts a form of my invention wherein the oscillator includes certain electrodes of the high vacuum tube;

Fig. 4 shows a form of my invention using an intermittent oscillator wherein the oscillation frequency is much higher than the desired sweep frequency;

Fig. 5 is a schematic representation of an embodiment of the present invention employing a tuned-plate, tuned-grid oscillator;

Fig. 6 shows the form of the voltage derived from Fig. 5;

Fig. 7 depicts my invention in an embodiment that includes a constant current device to produce a linear time axis.

In standard practice, when a simple sine wave is not used to produce the time axis, the sweep voltage is usually obtained by charging or discharging a condenser periodically at a controlled rate. Also, the usual way of replenishing the condenser charge is by a gas filled electronic discharge device that will pass a large momentary current with low loss. Either a constant resistance or a constant current device is used to control the wave form of the voltage during the major portion of the cycle. The present invention notably differs from the usual practice in replacing the gaseous tube of the prior art with a high vacuum discharge tube, whereby sweep frequencies of much higher value can be obtained than with the prior art gaseous tubes.

In Fig. 1, the positive supply lead 8 is connected through resistance 9 to anode 10 of high vacuum tube 11, the cathode 12 of tube 11 being grounded and also connected to negative lead 13. Variable capacitance 14 is connected to the low potential side of resistance 9 and also to negative lead 13, that is, capacitance 14 is connected across the tube 11. Resistance 15 is connected to cathode 12 and through blocking condenser 16 to anode 10, and the sweep plates 17 and 18 of cathode ray tube 19 are respectively connected to opposite terminals of the resistance 15. Oscillator 20 is connected across grid 21 and cathode 12 of tube 11 to control the passage of the electron stream through tube 11.

The operation of the above described circuit is as follows:

Assuming that grid 21 is negative and tube 11 is blocked, then capacitance 14 will charge at an exponential rate through resistance 9 and will build up a potential dependent upon the parameters of the circuit, and the potential thus built up will be impressed upon plates 17 and 18 across resistance 15. When oscillator 20 swings positive the voltage on grid 21 will become more positive and will reach a value at which tube 11 is no longer blocked and the tube will then pass current, resulting in a collapse of the potential across capacitance 14 and hence in the drop of potential between sweep plates 17 and 18 and the cathode ray spot will return to its initial position.

Fig. 2 shows the relation of the voltage across capacitance 14 to the voltage of grid 21 as derived from oscillator 20. The curve 22 is shown as beginning at the point where the voltage on grid 21 has become sufficiently positive to permit tube 11 to pass current and curve 23 is shown as beginning with the drop of potential on capacitance 14 resulting from the passage of current through tube 11. The portions of curves 22 and 23 between lines A and B show the fall of voltage on condenser 14 and consequently on plates 17 and 18. When the voltage on grid 21 passes the point B the tube 11 is again blocked and the voltage on capacitance 14 builds up until the line A' when the discharge phase of the cycle again begins and continues to line B'. The values of capacitance 14, resistance 9 and of the supply voltage through leads 8 and 13 determine, with the frequency of oscillator 20, the amplitude of the sweep. That is, with the other factors being constant, if the period of oscillator 20 is made less than the time required for capacitance 14 to reach full voltage, the voltage of capacitance 14 will be limited thereby and thus the amplitude of the sweep will be decreased, but if the period of oscillator 20 is greater than the charging time of capacitance 14 then the amplitude of the sweep will be determined by the voltage on capacitance 14.

One embodiment of this form of the invention was made wherein the capacitance between the anode and the cathode was reduced to the interelectrode capacitance of tube 11, which was of the type commercially known as type 50, and a sweep frequency of three million cycles per second with good amplitudes was easily obtained. Synchronizing was effected by applying a harmonic voltage of the grid of the tube in oscillator 20.

For general work, when it may be desired to cover a range of fifteen cycles to three million cycles, the form of invention shown in Fig. 1 is somewhat bulky and inconvenient owing to the necessary equipment to obtain the range mentioned. The apparatus may be somewhat reduced by utilizing the form of invention shown in Fig. 3 where the grids 24 and 25 of high vacuum tube 26 constitute the electrodes of an oscillatory system that includes inductance 27 and capacitance 28. In other respects the disclosure of Fig. 3 is the same as that in Fig. 1 and the corresponding elements have been designated by the same reference characters.

A more compact and convenient form of my invention is illustrated in Fig. 4. The high vacuum tube 29 has its cathode 30, grid 31 and anode 32 connected to the oscillating network comprising the variable resistance 33, the smoothing capacitance 34 in parallel therewith, inductance 35, capacitances 36 and 37 and voltage divider 38, the oscillatory system having a frequency much higher than the highest desired sweep frequency.

Average anode-cathode current traversing resistor 33 and smoothed by capacitance 34 will maintain a steady bias on grid 31 that blocks the tube when the potential on anode 32 is less than a predetermined value. When operation is started, capacitance 39 is charged through resistance 40 and after a predetermined time the voltage on capacitance 39, and hence on anode 32, will rise to such value that the potential on grid 31 no longer blocks the tube. Current will then flow and the tube will begin to oscillate violently which results in a heavy average current that is much higher than can be supplied through resistance 40 and must therefore be drawn from the energy stored in capacitance 39. The stored energy is soon depleted and the oscillations cease. It is apparent that the potential on capacitance 39 is applied through capacitance 41 and resistance 42 to the sweep plates of cathode ray tube 19. A synchronizing potential may be applied between the lead 43 and ground.

Fig. 6 shows the form of the voltage, which arises from the minimum at point 44 to a value at 45 where tube 29 begins to oscillate, the voltage dropping as shown between the lines A and B and then rising again to the point A′, etc.

The embodiment shown in Fig. 5 is in general similar to that in Fig. 4 except that the oscillations are derived from coupling the parallel resonant circuits 46 and 47 to constitute a tuned-plate, tuned-grid oscillator. A further difference is that a fixed bias is applied to grid 31 through the lead 48. The synchronizing voltage is applied between lead 43 and ground.

In both the forms of the invention shown in Figs. 4 and 5 the value of capacitance 39 determines the frequency of the sweep, with all other values being fixed, since it is this value that governs the time required to reach the anode potential at which the tube 29 begins to pass current and oscillate. It is therefore obvious that, since capacitance 39 must reach the predetermined anode voltage before discharge begins and since the amplitude of the sweep depends solely upon that voltage, changing the value of capacitance 39 does not alter the amplitude of the sweep voltage. Thus, also, changing the value of the resistance 40 or of the supply voltage varies the frequency only. However, by changing the blocking voltage the amplitude and the frequency are both affected simultaneously and in the opposite sense due to the fact that when the blocking voltage is decreased the voltage of capacitance 39 at which oscillation begins is lowered and the sweep amplitude is thus decreased while the frequency is increased.

The embodiments of the present invention above described produce exponential time axes due to the fact that the resistance is constant.

The form depicted in Fig. 7 uses a constant current and hence produces a linear time axis. In this figure the high vacuum tubes 49 are connected in parallel with the common oscillatory network comprising the inductance 50 and capacitances 51 and 52 connecting the anodes 53 and grids 54. The variable resistance capacitance 55 is connected to the anode 57 of an additional high vacuum tube 58 and through resistance 56 to grids 54. Grid 59 of tube 58 is variably connectible to cathode resistor 60 and screen grid 61 is connected between resistances 62 and 63 that are connected to positive supply lead 8 and to ground. The storage capacitance 64 is connected between the low potential side of resistance 55 and the low potential side of resistance 60 and the potential on capacitance 64 is impressed upon plates 17 and 18 of cathode ray tube 19. Synchronizing voltages are impressed upon grids 54 between lead 43 and ground. The elements of tube 58 are so connected and biased as to constitute a constant current device.

It is apparent that the tubes 49, being in parallel, will pass a comparatively large total current and will quickly charge capacitance 64, but when the tubes 49 are blocked the capacitance 64 will discharge through the constant current device that includes tube 58 and hence the drop in potential on the plates 17 and 18 will be linear. The frequency is altered by changing the values of resistors 60, 62 and 63 or of capacitance 64 while both amplitude and frequency are changed by varying the value of the resistor 55. This form of the invention has been built into several 500 kilocycle sweep circuits and has been found very satisfactory at that frequency.

The invention herein described and claimed may be used and/or manufactured by or for the Government of the United States of America for governmental purposes without the payment of any royalties thereon or therefor.

I claim:

1. Apparatus for periodically applying a potential that increases for a predetermined time, comprising a first capacitance, a positive lead including a first resistance connected to one side of said first capacitance, a negative lead connected to the opposite side of said first capacitance, a pair of electrodes between which said increasing potential is applied, means including a second capacitance connecting one of said electrodes to the positive-connected side of said first capacitance, means connecting the other of said electrodes to the negative-connected side of said first capacitance, a second resistance connected across said electrodes, a high vacuum tube having an anode, a cathode and a control grid, oscillatory circuit means connecting said grid and said anode and operatively connected to said one side of said first capacitance and to said first resistance, the period of oscillation of said circuit being very short as compared to the period of application of said potential, a third resistance connecting said cathode to said negative lead and a smoothing capacitance in parallel with said third resistance, and means to apply synchronizing voltages to said grid.

2. Apparatus for periodically applying a potential that increases for a predetermined time, comprising a high vacuum electron discharge device having an anode, a grid and a cathode, a parallel resonant circuit connected to said anode, a first resistance in series with said circuit, a first capacitance connected at one side to a point between said first resistance and said circuit and at the other side to said cathode, a parallel resonant circuit connected to said grid and coupled to the first mentioned resonant circuit, means to apply a steady bias to said grid, a pair of electrodes between which said increasing potential is applied, means including a second capacitance connecting one of said pair to one side of said first capacitance and to said anode and means connecting the other of said pair to the other side of said first capacitance and to said cathode.

3. Apparatus for periodically applying a potential that increases for a predetermined time, comprising a tuned-grid tuned-plate oscillator network including a high vacuum electron discharge device having a cathode, a grid and an anode, anode supply means including a resistance, means to bias said grid, means to apply a synchronizing potential to said grid, a pair of electrodes between which said increasing potential is applied, means connecting one of said pair to the low potential end of said resistance, means connecting the other of said pair to said cathode, and a capacitance connected across said last-mentioned two connecting means.

4. Apparatus for periodically applying and removing a potential, comprising a plurality of high vacuum tubes in parallel, each of said tubes having a cathode, a grid and an anode, the like elements in all of said tubes being connected to a respective common point, oscillatory circuit means connecting all said anodes with all said grids, a variable resistance connected to the cathodes of said tubes, means connecting the low potential side of said resistance to the grids of said tubes; an additional high vacuum tube having an anode connected to the low potential side of said resistance, a cathode, a suppressor grid connected to the last mentioned cathode, a screen grid and a control grid; a second resistance connected to the cathode of said additional tube, means variably connecting the control grid of said additional tube to said second resistance, a capacitance connected to the anode of said additional tube and to the low potential side of said second resistance, a positive supply lead connected to the anodes of said parallel connected tubes through said oscillatory circuit, resistance means connected between said positive lead and the low potential side of said second resistance, means connecting an intermediate point of said resistance means to said screen grid, means to apply a synchronizing potential to the grids of said parallel connected tubes, and a pair of electrodes connected across said capacitance to have impressed upon them the potential across said capacitance.

5. Apparatus for periodically applying and removing a potential, comprising a plurality of high vacuum tubes in parallel, each of said tubes having a cathode, a grid and an anode, the like elements in all of said tubes being connected to a respective common point, oscillatory circuit means connecting all said anodes with all said grids, a variable resistance connected to the cathodes of said tubes, means connecting the low potential side of said resistance to the grids of said tubes; an additional high vacuum tube having an anode connected to the low potential side of said resistance, a cathode, and a plurality of grids; means associated with the elements of said additional tube to constitute a constant current device, means to apply synchronizing potentials to the grids of said parallel connected tubes, a capacitance connected across said constant current device, and a pair of electrodes operatively connected across said capacitance to have impressed upon them the potential across said capacitance.

6. Apparatus for periodically applying a potential that increases for a predetermined time, comprising a high vacuum electron discharge device having an anode, a grid and a cathode, a parallel resonant circuit connected to said anode, a first resistance in series with said circuit, a first capacitance connected at one side to a point between said first resistance and said circuit and at the other side to said cathode, a parallel resonant circuit connected to said grid and coupled to the first mentioned resonant circuit, and means to apply a steady bias to said grid.

7. Apparatus periodically applying a potential that increases for a predetermined time, comprising a tuned-grid tuned-plate oscillator network including a high vacuum electron discharge device having a cathode, a grid and an anode, anode supply means including a resistance, means to bias said grid, means to apply a synchronizing potential to said grid, and a capacitance connected at one side between the said resistance in the anode supply and the tuned-plate portion of said network and at the other side to said cathode.

8. Apparatus for periodically applying and removing a potential, comprising a plurality of high vacuum tubes in parallel, each of said tubes having a cathode, a grid and an anode, the like elements in all of said tubes being connected to a common point, oscillatory circuit means connecting all said anodes with all said grids, a variable resistance connected to the cathodes of said tubes, means connecting the low potential side of said resistance to the grids of said tubes; an additional high vacuum tube having an anode connected to the low potential side of said resistance, a cathode, a suppressor grid connected to the last mentioned cathode, a screen grid and a control grid; a second resistance connected to the cathode of said additional tube, means variably connecting the control grid of said additional tube to said second resistance, a capacitance connected to the anode of said additional tube and to the low potential side of said second resistance, a positive supply lead connected to the anodes of said parallel connected tubes through said oscillatory circuit, resistance means connected between said positive lead and the low potential side of said second resistance, means connecting an intermediate point of said resistance means to said screen grid, and means to apply a synchronizing potential to the grids of said parallel connected tubes.

9. Apparatus for periodically applying and removing a potential, comprising a plurality of high vacuum tubes in parallel, each of said tubes having a cathode, a grid and an anode, the like elements in all of said tubes being connected to a common point, oscillatory circuit means connecting all said anodes with all said grids, a variable resistance connected to the cathodes of said tubes, means connecting the low potential side of said resistance to the grids of said tubes; an additional high vacuum tube having an anode connected to the low potential side of said resistance, a cathode, and a plurality of grids; means associated with the elements of said additional tube to constitute a constant current device, means to apply synchronizing potentials to the grids of said parallel connected tubes, and a capacitance connected across said constant current device.

LA VERNE R. PHILPOTT.